United States Patent [19]
Barlow et al.

[11] 4,214,300
[45] Jul. 22, 1980

[54] THREE TERM (PID) CONTROLLERS

[75] Inventors: Paul Barlow, Liverpool, England; Kenneth R. Jones, 99 Stairhaven Rd., Liverpool, L19 7NW, Merseyside, England

[73] Assignee: Kenneth Robert Jones, Liverpool, England

[21] Appl. No.: 906,253

[22] Filed: May 15, 1978

[30] Foreign Application Priority Data

May 17, 1977 [GB] United Kingdom ............... 20597/77

[51] Int. Cl.² .................... G06G 7/66; G05B 11/42; G05B 13/00
[52] U.S. Cl. .................................. 364/105; 318/561; 318/610; 364/553
[58] Field of Search ............... 364/105, 106, 551, 552, 364/554, 481, 553; 318/561, 609, 610

[56] References Cited

U.S. PATENT DOCUMENTS

| | | | |
|---|---|---|---|
| 3,105,928 | 10/1963 | Congleton et al. | 318/561 |
| 3,109,970 | 11/1963 | Smyth | 318/561 |
| 3,466,430 | 9/1969 | Hardaway | 364/105 |
| 3,741,474 | 6/1973 | Kawada et al. | 364/105 X |
| 3,781,626 | 12/1973 | Kubo et al. | 318/610 X |
| 4,094,959 | 6/1978 | Ball et al. | 364/105 X |

*Primary Examiner*—Joseph F. Ruggiero
*Attorney, Agent, or Firm*—Cushman, Darby & Cushman

[57] ABSTRACT

A method and apparatus for adjusting a variable parameter of a dynamic system in response to a signal representative of the system performance so as to optimize system performance with respect to that parameter. A first signal related to system performance is extracted from the dynamic system and is thereafter coupled to a plurality of performance index blocks, each of these blocks for operating on this signal according to a different predetermined characteristic transfer function. The output level from a selected performance index block is periodically sampled and the sampled level is compared with a previously sampled level to provide a positive or negative difference signal. A first pulsed signal is formed wherein pulses and zero levels are respectively representative of the incidence of opposite polarity levels in the difference signal. This first pulsed signal is converted into a second pulsed signal wherein the leading and trailing edges of the pulses correspond to the incidence of adjacent pulses in the first pulsed signal. The zero axis position is shifted in relation to the second pulsed signal to obtain positive and negative signals whose width is representative of the extent to which the variable parameter of the dynamic system must be increased or decreased. The positive and negative signals are integrated to provide an output signal for adjusting this variable parameter.

12 Claims, 6 Drawing Figures

THREE TERM (PID) CONTROLLERS

The present invention relates to one, two or three term (PID) controllers for closed loop, process control systems.

Three term PID controllers are used in control systems to enable such systems to respond to three different functions of the system error, namely a Proportional function, an Integral function and a Differential function. In conventional systems, the response characteristic of the three control channels corresponding to these three functions are arranged to be manually pre-set by a system operator in accordance, inter alia, with the operational characteristics of the process being controlled. However, should these characteristics of the process change with time, either the efficiency of the control becomes lower or further manual adjustments have to be made, probably by trial and error, in order to attempt to regain an optimum operating condition.

In accordance with the present invention, there is provided a method of optimising the operating characteristics of a process which is controlled by a closed loop control system using a three term (PID) controller having three control channels, comprising monitoring a predetermined characteristic function of the system error and automatically adjusting the response characteristic of said controller in dependence on said function value.

The present invention also provides a circuit for controlling a three term (PID) controller in a closed loop control system for a process, comprising first means for monitoring a predetermined characteristic function of the system error and second means for automatically adjusting the response characteristic of said controller in dependence on said function value.

The invention is described further hereinafter, by way of example, with reference to the accompanying drawings, in which.

Figure 1:
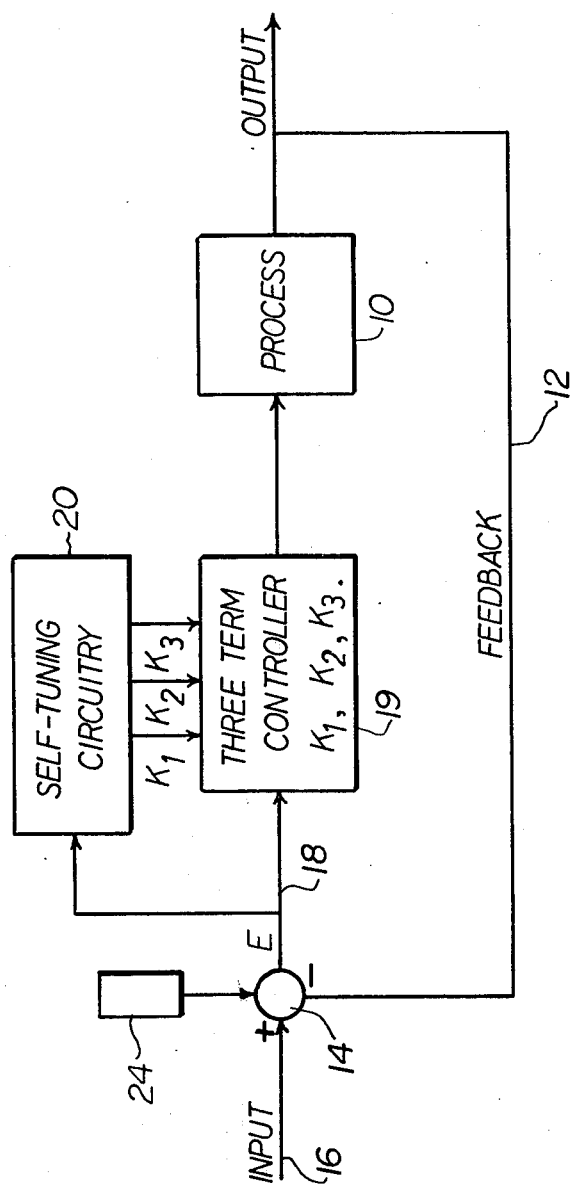
FIG. 1 is a block circuit diagram of a closed loop control system which includes a three-term controller having a self-tuning circuit in accordance with the present invention.

The closed loop system of FIG. 1 includes a process 10 which is to be controlled in accordance with a predetermined characteristic. For this purpose an output signal of the process 10, for example from some form of electrical transducer which is responsive to an operational parameter of the process such as temperature, pressure etc., is fed back by way of a line 12 and subtracted in a comparator 14 from an input signal on a line 16 to form a system error signal E on a line 18. The error signal E on line 18 is used as an input control signal for the process 10 by way of a three term (PID) controller 19 which enables the process control to be responsive to the three different functions of the error E, that is the Proportional function, Integral function and Differential function. Each function has an associated channel gain designated by $K_1$, $K_2$ and $K_3$, respectively.

The system as so far described is conventional. Normally in such a system, the channel gains $K_1$, $K_2$ and $K_3$ are set up manually at the start of the process and remain unaltered until such time as a further manual adjustment is made, for example upon the operator realising that a long term variation in the process conditions has occurred which requires the system response to be altered.

In the present system, means are provided for automatically adjusting the various channel gains $K_1$, $K_2$, and $K_3$ of the three term controller to take account of variations, of both a short and long term nature, in the process conditions and to maintain optimum control as defined by a predetermined characteristic function, preferably some function of the system error E, referred to as the performance index and related to the system efficiency. For this purpose, the system includes a self-tuning circuit 20 which is illustrated in more detail in FIGS. 2 and 3.

Figure 2:
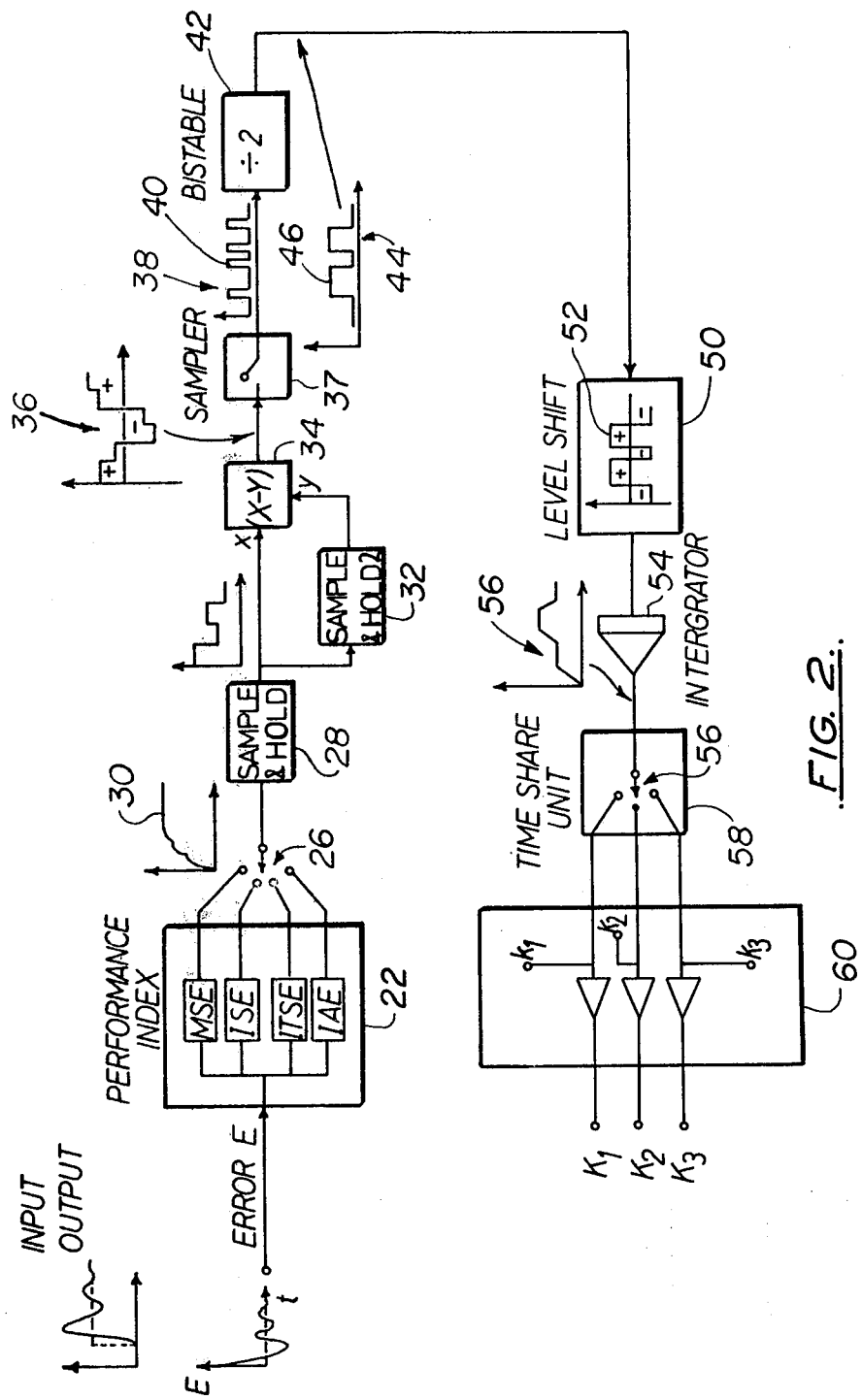
FIG. 2 is a block circuit diagram of one embodiment of the self-tuning circuit for the controller of FIG. 1.

In the circuit 20, the system error signal E is applied as an input signal to a circuit element 22 where a performance index is established. As indicated in FIG. 2, the performance index can be pre-selected from a plurality of predetermined functions of the system error E of which there are four in this embodiment, namely Mean Square Error (MSE), Integral of Squared Error (ISE), Integral of Absolute Error (IAE) and Integral of Time and Absolute Error (ITAE), these being examples only of the type of function which may be utilised. The choice of the particular function used to determine the performance index is made by the operator in accordance with the characteristics of the particular process 10 which is to be controlled. In general, the performance index characteristic corresponds to a simple or complex curve of the type in which x is a double value function of y and which has a stationary value in the range of interest, i.e. it defines a peak or a trough on the curve where the performance index level corresponds to the ideal performance condition of the process.

In order to collect information in the form of a performance index level, the system injects its own test signal into the process by means of a unit 24 (FIG. 1). The test signal is preferably in the form of a step input signal and gives rise to a particular process output signal. This is fed back to the comparator 14 and compared with the input signal on line 16 to provide an error signal E applied to the self-tuning circuit 20. Step input signals are provided by a plurality of low level square wave pulses injected by unit 24 into the process at the comparator 14. The test signal need not of course be a step signal, a random signal or a sine wave for example could also serve as a test signal. The test signal can be injected continuously or in bursts to provide periodic retuning of the controller 19 as described below.

The error signal E applied to the circuit element 22 is transformed by the selected performance index block to an output signal, indicated diagrammatically in FIG. 2, which settles to a steady state voltage level 30 and is directed via a manually settable selector switch 26 to a first sample and hold element 28 which samples the level 30 and stores it. The voltage level 30 represents a performance index level X. The element 28 then passes the stored level 30 to a second sample and hold element 32 and samples and stores the voltage level generated by the selected performance index block in response to an error signal resulting from the next successive test signal. This voltage level represents a performance index level Y. The two values X and Y representing the previous and present performance index levels derived from successive test signal pulses are presented to subtracting element 34 where these values are compared to provide a difference signal. The result of a number of comparisons of successive levels might, for example, look like that illustrated diagrammatically at 36 in FIG. 2. In dependence upon the results of such comparisons which themselves depend upon the positions of the corresponding voltage levels 30 on the selected performance index curve, the signal 36 comprises a plurality of positive and negative levels each of which is the result of a comparison of two successive levels 30. A positive level indicates an increasing system error E and thus a movement of the performance index level away from the stationary or optimum value. Conversely a negative level indicates a decreasing system error and a movement of the performance index level towards the optimum. It will therefore be appreciated that when the level changes from positive to negative or vice versa this indicates that the performance index level has passed through the stationary value. The positive and negative levels are passed to a sampling device 37 which is adapted to deliver a logic "1" level for positive difference signals 36 and to deliver a logic "0" level for negative difference signals 36. Thus, as shown diagrammatically at 38 in FIG. 2, the sampling device 37 provides a series of rectangular pulses 40 separated by spaces of width corresponding to the incidence of negative difference signals. In order to convert these pulses 40 into a more useful signal, they are passed through a divide by two element 42, such as a bistable, to provide a signal indicated diagrammatically at 44 in FIG. 2 comprising a plurality of pulses 46 whose leading edge corresponds to one of the pulses 40 and whose trailing edge corresponds to the next occurring pulse 40. Thus, the width of the pulses 46 corresponds to the spaces between the pulses 40 and hence depends upon the incidence of positive or negative differences at the subtracting element 34, this in turn being dependent upon the position of the successive voltage levels 30 on the performance index curve.

Since each change in the level of the signal 44 thus indicates that the performance index has passed through the stationary valve the signal 44 is thus in the nature of a direction control signal which can be used to govern whether the parameter which is to be optimised should be increased or decreased. This is achieved by changing the position of the zero axis of the curve 44 in a level shift device 50 to obtain positive and negative signals 52 of variable width which are passed through an integrator 54 to provide a voltage output, indicated diagrammatically at 56 in FIG. 2, of amplitude appropriate to adjust the relevant channel gain $K_1$, $K_2$ or $K_3$ of the controller 19 in an increasing or reducing direction to adjust the performance index to an optimum condition.

As indicated in FIG. 2, the integrator output can be selectively passed either to adjust the channel gain $K_1$, $K_2$ or $K_3$ depending upon the position of the switch 56 of a time sharing unit 58. The latter is coupled via the three channels $K_1$, $K_2$, $K_3$ to the controller 19 and by means of the unit 58 each of the channel gains $K_1$, $K_2$ and $K_3$ can be automatically adjusted by the circuit 20 in strict rotation by allocating a predetermined period to each in turn. The references $k_1$, $k_2$ and $k_3$ are intended to refer to the manual settings of the channel gains $K_1$, $K_2$ and $K_3$ which are supplemented by the automatic adjustment provided by the aforegoing arrangement, each associated manual and automatic gains being combined in a respective multiplier unit e.g. an analogue unit 60 connected to the three term controller 19.

Figure 3:
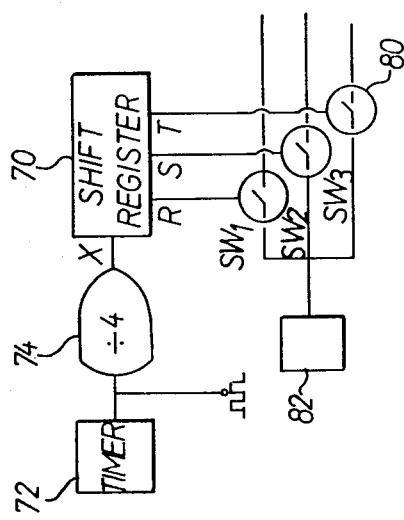
FIGS. 3 and 4 are circuit diagrams illustrating one form of time sharing unit.
Figure 4:
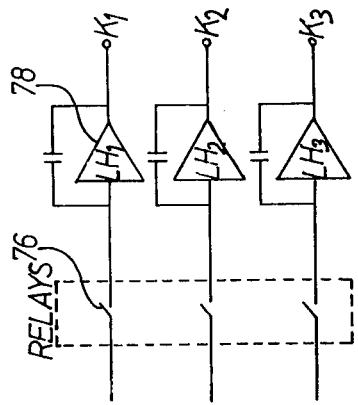

It will be noted that a fail-safe provision is made in that in the event of a breakdown in the adaptive loop 20, the controller 19 reverts to the manual settings. A practical form of time sharing unit is shown in FIGS. 3 and 4 where the switch 56 is in the form of a shift register 70. The latter is driven by a pulse signal applied thereto from a timer 72 via a divider circuit 74, in practice a divide by 4. The integrator 54 is coupled to the amplifiers 60 by way of respective switches 76 and integrate and hold amplifiers 78 connected in series. The switches 76 may be semiconductor switches but conveniently are relays whose solenoids are controlled by the shift register 70 via further switches 80. The latter may also be semiconductor switches.

The switches 80 connect a source 82 of clock pulses to the relay solenoids such that as the shift register successively closes each switch 80 (only one switch 80 is closed at any one time) a clock pulse is applied to the associated relay solenoid to close the relay switch 76 and apply the output of the integrator 54 to the associated integrate and hold circuit 78. The latter includes a hold facility to maintain the previously received signal presented to the three term controller 19 when the associated relay switch 76 is open.

In the above manner new values for the channel gains $K_1$, $K_2$ and $K_3$ are computed in strict rotation.

The clock pulses from the source 82 are also used to synchronise the operation of other circuits in the self-tuning circuit 20, for example the sample and hold elements 28 and 32 and subtracting element 34, with the time sharing unit 58.

Figure 6:
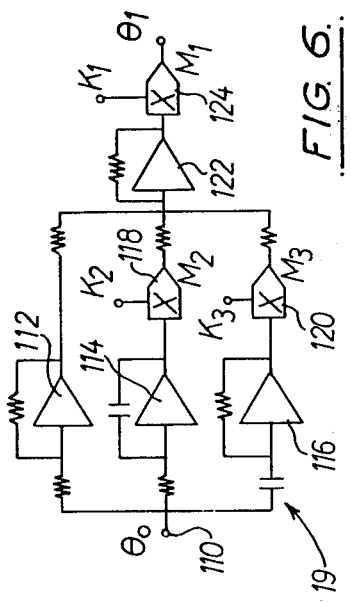
FIG. 6 is a detailed view of a three term P.I.D. controller of the system of FIG. 2.
Figure 5:
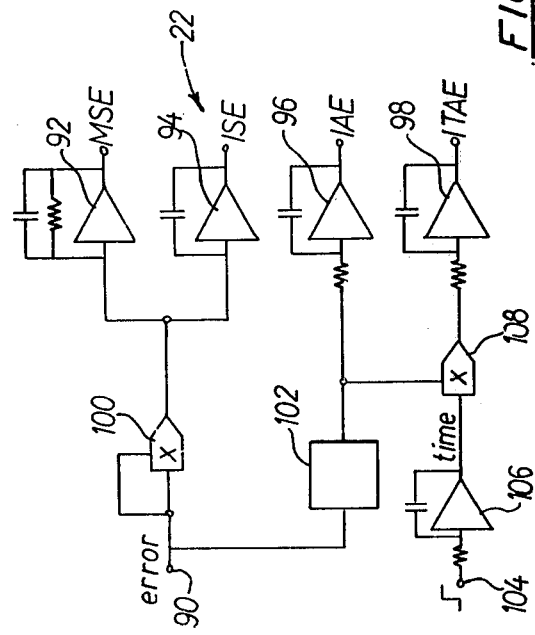
FIG. 5 is a detailed view of a circuit element of FIG. 2 for establishing the system performance index.

As will be understood the time sharing technique is beneficial from a cost basis since only one adaptive loop is necessary to cover all three channel gains $K_1$, $K_2$ and $K_3$ whereas a simultaneous technique would require one loop per channel gain. FIGS. 5 and 6 respectively show preferred circuits for the three term controller 19 and the performance index blocks in the circuit element 22.

Considering firstly the circuit element 22 of FIG. 5 this has an input 90 to which the error signal E is applied and a respective amplifier 92, 94, 96, 98 for each performance index function, the amplifiers having associated resistors and capacitors to provide the desired function shape. The input 90 is coupled to amplifiers 92 and 94 for the functions MSE and ISE by way of a multiplier unit 100 which multiplies the error signal E by itself to provide the required square function for MSE and ISE. The input 90 is also coupled to amplifiers 96 and 98 for the functions IAE and ITAE by way of a circuit 102 which provides a positive error signal E output regardless of the sign of the input error signal E. The time function of the ITAE function is provided by a step signal applied to input 104 of the circuit element 22 and to the amplifier 98 via an integrating amplifier 106 and a multiplier unit 108. The multiplier unit 108 multiplies the outputs signal to amplifier 98. The step signal is applied to the input 104 in synchronism with the operation of the self-tuning circuit 20.

The circuit illustrated in FIG. 6 is the practical embodiment of the system s domain transfer function which is as follows:

$$\theta_1/\theta_o = K_1(1 + K_2 1/s + K_3 S)$$

The circuit has an input 110 which divides into three paralleled branches each having a respective amplifier 112, 114 and 116. The outputs of amplifiers 114 and 116 are connected to respective multiplier units 118 and 120 to which the channels $K_2$ and $K_3$ of the self-tuning circuit 20 are also connected. The outputs of the multiplier units 118 and 120 and amplifier 112 are connected to the output of the three term controller 19 via a common amplifier 122 and a further multiplier unit 124. The channel $K_1$ of the self-tuning circuit 20 is applied to this multiplier unit 124.

While the present invention has been particularly described with reference to three term controllers it will be obvious to those skilled in the art that the invention also applies to one or two term controllers.

We claim:

1. An electronic circuit for adjusting a variable parameter of a dynamic system in response to a signal representative of the system performance so as to optimize the system performance with respect to that parameter, the circuit comprising:
   (a) means for extracting from the dynamic system a first signal dependent upon the system performance;
   (b) a plurality of performance index blocks coupled to said means for extracting so as to receive said first signal each of said blocks for providing a different predetermined characteristic function of said first signal;
   (c) switch means coupling said means for extracting to said plurality of performance index blocks for selecting one of said performance index blocks;
   (d) means coupled to said performance blocks for periodically sampling and comparing the output level from a selected performance index block with a previously sampled level and for providing a difference signal indicative of whether the result of said comparison is positive or negative;
   (e) means coupled to said means for sampling and comparing for providing a first pulsed signal wherein pulses and zero levels are respectively indicative of the incidence of opposite polarity levels in said difference signal;
   (f) means coupled to said means for providing a first pulsed signal for converting said first pulsed signal into a second pulsed signal wherein the leading and trailing edges of the pulses correspond to the incidence of adjacent pulses in said first pulsed signal;
   (g) means for shifting the zero axis position in relation to said second pulsed signal to obtain positive and negative signals whose width is indicative of the extent to which the parameter to be varied must be increased or decreased; and
   (h) integrator means for receiving said positive and negative signals and for providing an output signal for adjusting said parameter.

2. A circuit for controlling a one, two or three term (PID) controller in a closed loop control system for a process, comprising first means for monitoring a predetermined characteristic function of the system error; and second means for automatically adjusting the response characteristic of said controller in response to the value of said characteristic function, said first means comprising:
   a unit for injecting a test signal into said closed loop for deriving an error signal therefrom;
   a circuit element having a plurality of performance index blocks each of which provides a different predetermined characteristic function; and
   switch means coupling said circuit element to said second means for selecting one of said performance index blocks.

3. A circuit as claimed in claim 2 wherein said circuit element has four selectable performance index blocks respectively providing the following predetermined characteristic functions: Mean Square Error; Integral of Squared Error; Integral of Absolute Error; and Integral of Time and Absolute Error.

4. A circuit as claimed in claim 3 wherein said circuit element further includes:
   a multiplier unit for receiving and squaring said error signal;
   an amplifier for averaging the squared error signal from said multiplier to provide said Mean Square Error function; and
   an integrator for integrating said squared error signal to provide said Integral of Squared Error function.

5. A circuit as claimed in claim 4 wherein said circuit element further includes:
   a circuit for providing the modulus of the error signal; and
   an integrator connected thereto for integrating said error signal modulus to provide said Integral of Absolute Error function.

6. A circuit as claimed in claim 5 wherein said circuit element further includes:
   an integrator for receiving and integrating a step signal;
   a multiplier unit for multiplying said error signal modulus function with the integral of said step signal; and
   a further integrator for integrating the product of said error signal modulus and said integral to provide said Integral of Time and Absolute Error function.

7. A circuit as claimed in claim 2 wherein said second means comprises:
   a comparator for comparing predetermined characteristic function values derived from successive test signals;
   a complementary memory pair coupling said performance index block to said comparator and operable to sample and hold successive predetermined characteristic function values for comparison with one another; and
   third means for generating a correction signal in response to said comparison for adjusting said response characteristic.

8. A circuit as claimed in claim 7 wherein said response characteristic is the gain of at least one channel of said controller.

9. A circuit as claimed in claim 8 wherein said second means is operable for automatically adjusting the gains of three channels of said controller.

10. A circuit as claimed in claim 9 wherein said second means further comprises a time sharing unit for successively and separately adjusting said gains.

11. An electronic circuit for automatically adjusting the response characteristic of a one, two or three term (PID) controller in a closed loop control system in response to a predetermined function of the control system error, the circuit comprising:
   (a) means for injecting a test signal into said closed loop for creating a system error;
   (b) means for extracting from said control system a first signal in response to said system error;
   (c) a plurality of performance index blocks coupled to said first signal each of which blocks provides a different predetermined characteristic function of said first signal corresponding to said system error;

(d) switch means for selecting one of said performance index blocks;

(e) means for periodically sampling the output level from a selected performance index block and for comparing the sampled level with a previously sampled level to provide a difference signal indicative of whether the result of the comparison is positive or negative;

(f) means for providing a first pulsed signal wherein pulses and zero levels are respectively indicative of the incidence of opposite polarily levels in said difference signal;

(g) means for converting said pulsed signal into a second pulsed signal wherein the leading and trailing edges of the pulses of said second pulsed signal correspond to the incidence of adjacent pulses in said first pulsed signal;

(h) means for shifting the zero axis position in relating to said second pulsed signal to obtain positive and negative signals whose width is representative of the extent to which the response characteristic to be varied must be increased or decreased; and (i) integrator means for receiving said positive and negative signals to provide an output signal for adjusting said response characteristic.

12. A method for adjusting a variable parameter of a dynamic system in response to a signal representative of the system performance so as to optimize the system performance with respect to that parameter, the method comprising the steps of:

(a) extracting from the dynamic system a first signal dependent upon the system performance;

(b) coupling said first signal to a plurality of performance index blocks, each of which blocks provides a different predetermined characteristic function of said first signal;

(c) selecting one of said performance index blocks;

(d) periodically sampling the output level from the selected performance index block and comparing the sampled level with a previously sampled level to provide a difference signal representative of whether the result of the comparison is positive or negative;

(e) forming a first pulsed signal wherein pulses and zero levels are respectively representative of the incidence of opposite polarity levels in said difference signal;

(f) converting said pulsed signal into a second pulsed signal wherein the leading and trailing edges of the pulses correspond to the incidence of adjacent pulses in said first pulsed signal;

(g) shifting the zero axis position in relation to said second pulsed signal to obtain positive and negative signals whose width is representative of the extent to which the parameter to be varied must be increased or decreased; and (h) integrating said positive and negative signals to provide an output signal for adjusting said parameter.

* * * * *